United States Patent [19]

Takahashi

[11] Patent Number: 5,565,999
[45] Date of Patent: Oct. 15, 1996

[54] IMAGE DATA COMMUNICATION PROCESSING METHOD, AND APPARATUS THEREFOR

[75] Inventor: Masatomo Takahashi, Tokyo, Japan

[73] Assignee: Canon Kabushiki Kaisha, Tokyo, Japan

[21] Appl. No.: 808,811

[22] Filed: Dec. 17, 1991

[30] Foreign Application Priority Data

Dec. 21, 1990 [JP] Japan .................................. 2-405058
Feb. 4, 1991 [JP] Japan .................................. 3-035691

[51] Int. Cl.⁶ .......................................... H04N 1/00
[52] U.S. Cl. .......................... 358/406; 358/404; 358/468; 358/434; 358/439
[58] Field of Search ..................... 358/440, 444, 358/404, 406, 434, 438, 439, 435, 436, 468, 426, 400, 401, 407, 504, 500; 355/202, 203, 204, 205; 371/15.1, 16.1, 16.4, 20.1; 395/575

[56] References Cited

U.S. PATENT DOCUMENTS

| | | | |
|---|---|---|---|
| 3,733,587 | 5/1973 | Lloyd et al. | 364/917 |
| 4,517,638 | 5/1985 | Provisor et al. | 358/491 |
| 4,531,189 | 7/1985 | Mosier et al. | 358/426 |
| 4,631,598 | 12/1986 | Burkhardt et al. | 358/425 |
| 4,789,900 | 12/1988 | Takahashi | 358/439 |
| 4,823,193 | 4/1989 | Takahashi | 358/434 |
| 4,829,569 | 5/1989 | Seth-Smith et al. | 358/471 |
| 4,882,705 | 11/1989 | Yasue | 395/575 |
| 4,899,306 | 2/1990 | Greer | 364/916.4 |
| 4,947,345 | 8/1990 | Paradise et al. | 358/442 |
| 4,965,676 | 10/1990 | Ejiri et al | 358/406 |
| 4,980,780 | 12/1990 | Tanaka | 358/401 |
| 4,989,084 | 1/1991 | Wetzel | 358/108 |
| 5,036,479 | 7/1991 | Prednis et al. | 364/571.02 |
| 5,065,254 | 11/1991 | Hishida | 358/400 |
| 5,084,875 | 1/1992 | Weinberger et al. | 355/205 |
| 5,138,618 | 8/1992 | Honda et al. | 371/16.4 |
| 5,161,037 | 11/1992 | Saito | 358/468 |
| 5,170,267 | 12/1992 | Blitz et al. | 358/406 |
| 5,175,633 | 12/1992 | Saito et al. | 358/406 |
| 5,196,944 | 3/1993 | Sakate | 358/404 |
| 5,251,297 | 10/1993 | Takayanagi | 358/403 |

FOREIGN PATENT DOCUMENTS

| | | | |
|---|---|---|---|
| 0161761 | 12/1981 | Japan | H04N 1/00 |
| 0125575 | 8/1982 | Japan | H04N 1/00 |
| 0069161 | 4/1983 | Japan | H04N 1/00 |
| 0022475 | 2/1984 | Japan | H04N 1/00 |
| 0180272 | 9/1985 | Japan | H04N 1/00 |
| 0202966 | 8/1989 | Japan | H04N 1/00 |

*Primary Examiner*—Edward L. Coles, Sr.
*Assistant Examiner*—Fan Lee
*Attorney, Agent, or Firm*—Fitzpatrick, Cella, Harper & Scinto

[57] ABSTRACT

An image processing system, such as a facsimile system, in which a source transmits information to a receiver. The information includes an identification signal which indicates whether image data or an extended program, such as a diagnostic program, is to follow. If image data follows, the receiver processes the data in a normal manner. If the diagnostic program follows, it is stored in a memory for subsequent execution. Since the program doesn't have to be stored in the memory at all times, the memory is used more efficiently. The receiver may request transmission of the diagnostic program in the event of a system failure. The source may transmit a starting time for execution of the diagnostic program.

20 Claims, 8 Drawing Sheets

IMAGE DATA COMMUNICATION PROCESSING METHOD, AND APPARATUS THEREFOR

BACKGROUND OF THE INVENTION

1. Field of the Invention

This invention relates to a method and apparatus for image data communication processing. For example, the invention relates to a method and apparatus for image data communication processing in which a writable memory is provided and the apparatus is operated in accordance with received data stored in this memory.

2. Description of the Prior Art

A conventional image data communication processing apparatus is provided with a memory for writing in received data and the like. Furthermore, a conventional facsimile apparatus or the like has a built-in memory function, such as for broadcast transmission and for intercepting. An increase in the number of functions using a memory in such fashion is accompanied by an increase in maintenance servicing for the apparatus. Since maintenance servicing generally is performed by dispatching a serviceman to the user's location, greater cost and time are involved in maintenance.

In recent years, communication processing apparatus have been developed in which a diagnostic program for maintenance purposes is stored, along with a program for implementing the usual communication function, in a ROM (read-only memory) incorporated within the apparatus. When a malfunction or the like occurs, the diagnostic program is executed so that the location of the trouble can be automatically found.

Though the diagnostic program can make the serviceman's job easier and reduce the time required for maintenance, it does not provide the user with new functions. Furthermore, since the diagnostic program occupies a limited memory space available within the ROM, problems are encountered in terms of utilization efficiency of the memory, and in cost performance.

SUMMARY OF THE INVENTION

Accordingly, an object of the present invention is to provide a method and apparatus for image data communication processing whereby memory space can be utilized efficiently and memory function can be enhanced.

According to the present invention, the foregoing object is attained by providing an apparatus for image data communication processing comprising receiving means for receiving program information sent from a device on a transmitting side, memory means for storing the program information received by the receiving means, designating means for designating start of execution of the program stored by the memory means, and control means for controlling execution of the program information started by the designating means.

Further, the present invention provides an apparatus for image data communication processing comprising transmitting means for transmitting program information, which is executable by a terminal on a receiving side, to the terminal on the receiving side, and means for transmitting program information starting time to the terminal on the receiving side.

Further, the present invention provides a method of image data communication processing comprising a receiving step of receiving program information from a device on a transmitting side, a storing step of storing in a memory the program information received at the receiving step, and a step of executing the program stored in the memory.

The communication processing method and apparatus described above make it possible to utilize the memory space of a ROM efficiently so that the memory function employed by the user can be enhanced.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the accompanying drawings.

[First Embodiment]

Figure 1:
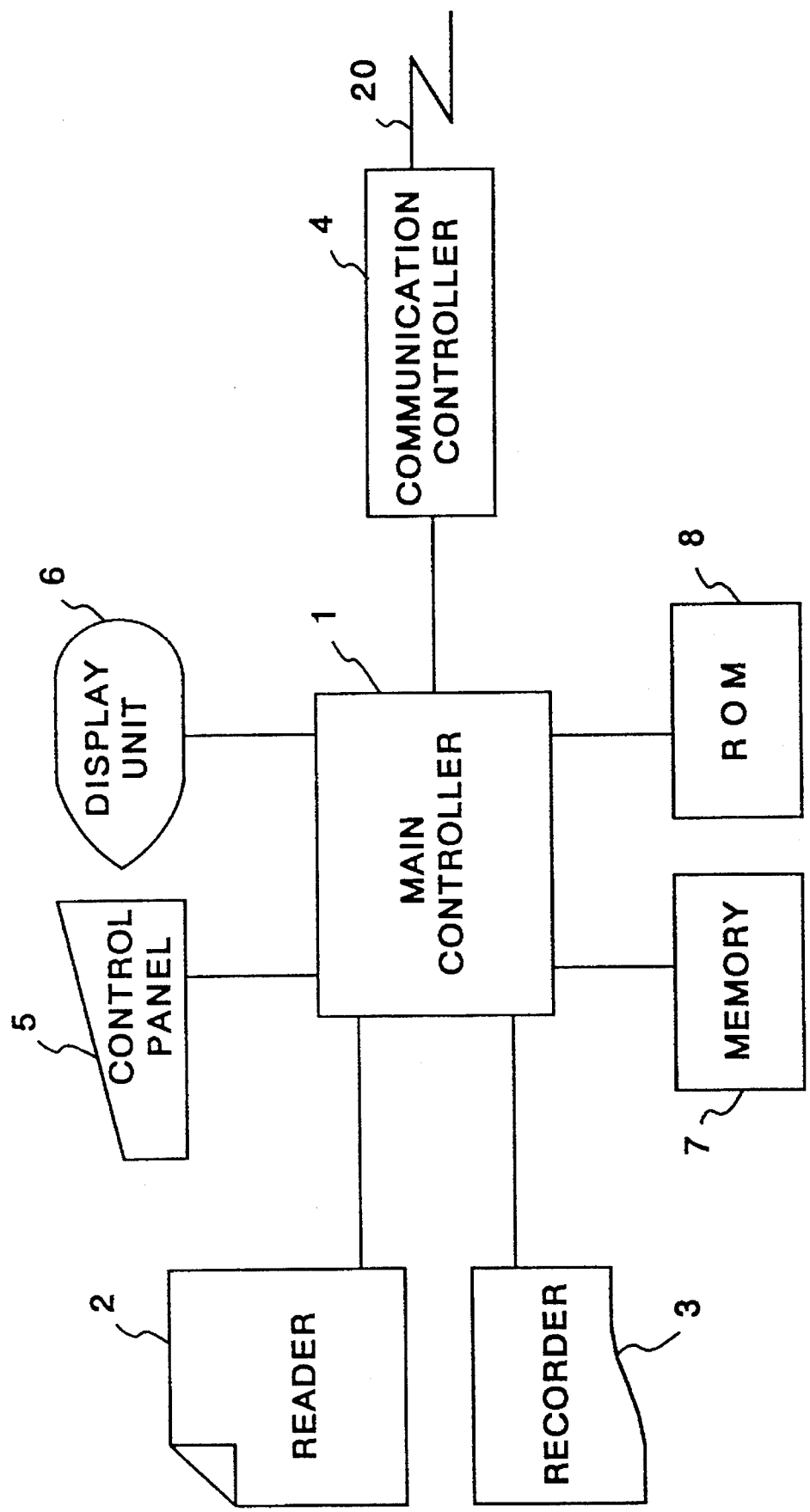
FIG. 1 is a block diagram illustrating a facsimile apparatus according to a first embodiment of the present invention.

FIG. 1 is a block diagram illustrating a facsimile apparatus according to a first embodiment of the present invention. The facsimile apparatus includes a main controller 1 for controlling the overall operation of the facsimile apparatus. The main controller 1 includes a microprocessor that operates in accordance with a program stored in a ROM, described below, and a RAM serving as a working area. A reader 2, which is constituted by such components as a CCD image sensor and a mechanism for conveying an original, reads an image carried on the original and converts the read image into image data. A recorder 3, which is a printer such as a thermosensitive printer or laser printer, records the image on a recording medium. A communication controller 4, which is constituted by a modem and a network control unit (NCU), etc., performs data communication via a line 20. A control panel 5 is equipped with keys which the operator uses to enter the destination of transmission data, and keys which the operator uses for utilizing various facsimile functions. A display unit 6, such as an LCD, displays various information, such as the status of the facsimile apparatus. A memory 7 is used for storing received image data, image data to be transmitted, and a received program, as described below. A ROM 8 is a memory for storing a control program in accordance with the flowchart of FIG. 3, which is described later.

The facsimile apparatus of this embodiment constructed as set forth above receives a transmitted diagnostic program and then executes this program.

A method of transmitting the diagnostic program in accordance with this embodiment will now be described.

Figure 2:
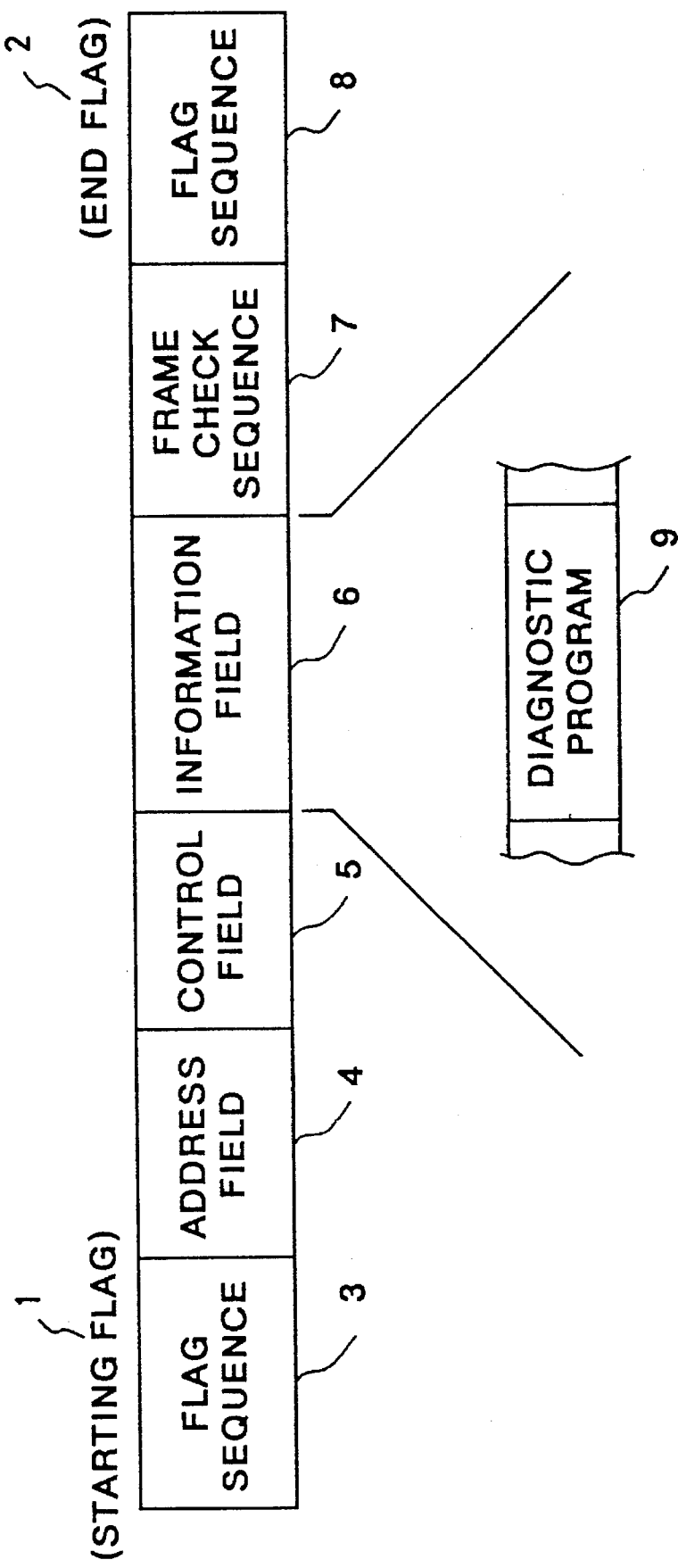
FIG. 2 is a diagram showing the construction of a frame in a HDCL procedure used in the facsimile apparatus of the first embodiment.

In the facsimile apparatus of this invention, a binary control procedure is used and the frame construction of high-level data-link control (HDLC) is employed. FIG. 2 is a diagram showing the frame construction of an HDCL procedure. In accordance with an HDCL procedure, an information message or control information usually is transmitted in frame units. As shown in FIG. 2, one frame is composed of a flag sequence 3 and 8, which is located at both ends of the frame, for indicating the beginning and end of the frame, an address field 4 indicating the addresses of the destination and transmitting party, a control field 5 which includes commands for the destination, an information field 6 which includes control information and message information, etc., and a frame-check sequence 7 for error control.

A diagnostic program 9 is impressed upon the HDLC frame and transmitted as a program file having an execution format. The diagnostic program 9 is transmitted upon being set in the information field 6. For example, it can be considered that the image data in the ECM transmission system in accordance with the CCITT advisory is replaced by the program in the execution format.

The operation of the facsimile apparatus according to this embodiment will now be described.

Figure 3:
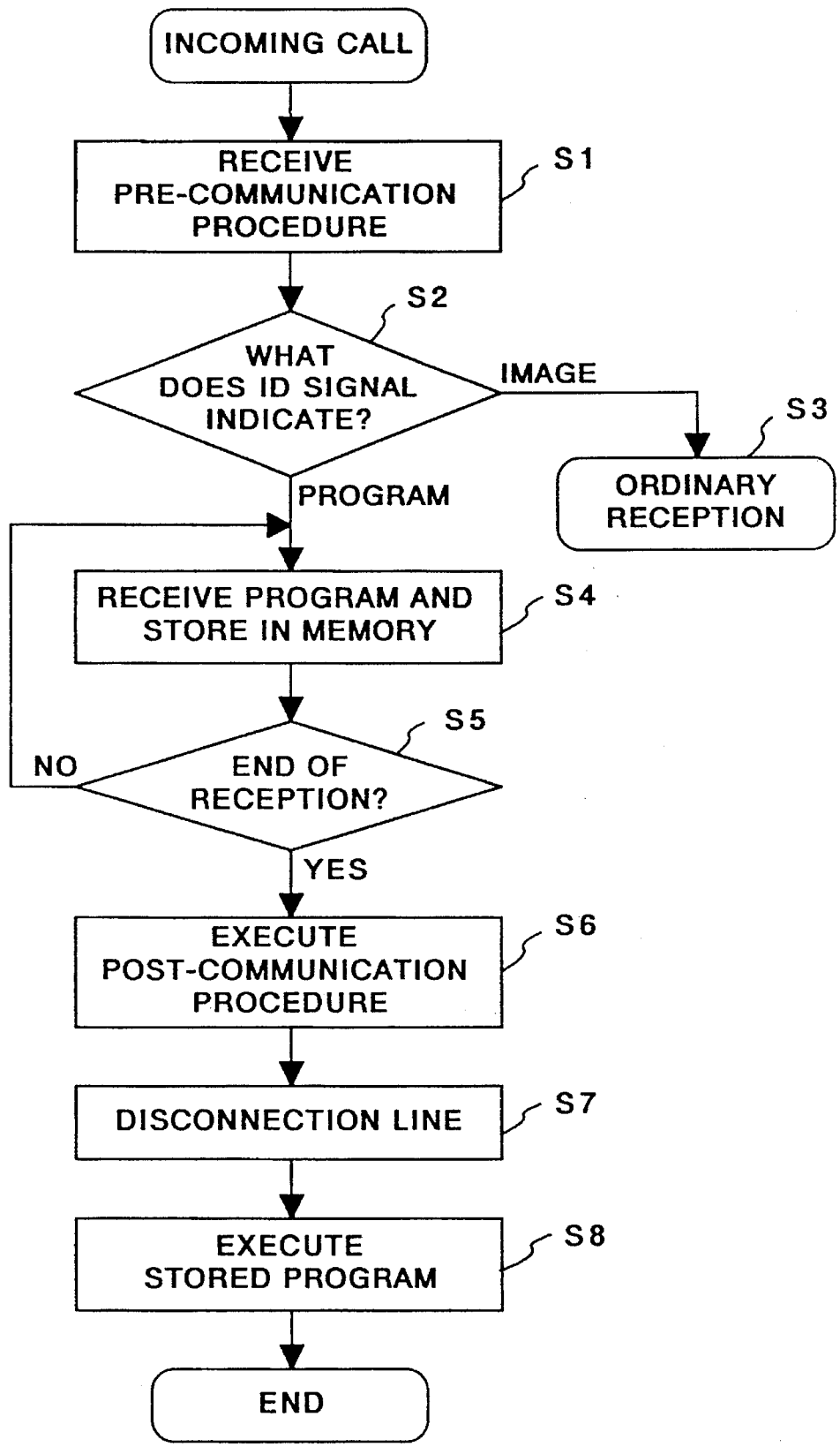
FIG. 3 is a flowchart for describing, in outline form, the operation of reception processing by a main controller in the facsimile apparatus of the first embodiment.

FIG. 3 is a flowchart for describing, in outline form, reception processing performed by the main controller 1 in the facsimile apparatus according to this embodiment.

According to the control program, the controller 1 receives a pre-communication procedure at step S1 in FIG. 3 when a reception operation is started by an incoming signal from the line 20. In case of a G3 facsimile, for example, it is determined whether image data or a diagnostic program will be sent. The determination is based upon a received NSS signal (non-standard set-up), from the transmitting side, in accordance with CCITT advisory T.30, and information (hereinafter referred to as "NSS information") attached to the NSS signal. In other words, a predetermined identification signal contained in the NSS information is discriminated at step S2. In a case where it is determined, based upon identification of the NSS information, that image data will be sent, processing proceeds to step S3, at which ordinary reception is performed. If it is determined at step S2 that the diagnostic program will be sent, however, then processing proceeds to step S4, at which the diagnostic program sent incorporated in the frame is received and written in the memory 7. Here the memory 7 is used as a FIFO buffer or for intercepting at the time of ordinary reception of image data.

If one frame has thus been received and the diagnostic program impressed upon this frame has been stored in memory 7, it is determined at step S5 whether a frame to be received still remains. If a frame to be received still remains, then the processing returns to step S4 so that the next frame may be received and stored in memory.

Thus, the processing of steps S4 and S5 is executed repeatedly until transmission of the entire diagnostic program ends. If the end of reception has been confirmed at step S5, a post-communication procedure is executed at step S6 and the line is disconnected at step S7.

This is followed by step S8, at which the main controller 1 executes the diagnostic program that has been stored in the memory 7. Execution of the diagnostic program is carried out by calling it, in the form of a subroutine, from the control program stored in the ROM 8.

Thus, by means of the identification signal of the pre-communication procedure, the facsimile apparatus on the transmitting side indicates to the apparatus on the receiving side, in advance, whether image data or the diagnostic program is to be transmitted, and then subsequently transmits the diagnostic program. Meanwhile, the facsimile apparatus on the receiving side stores the diagnostic program received in accordance with this procedure in the memory 7 and then executes this program.

Conversely, the apparatus on the receiving side requests the apparatus on the transmitting side for the diagnostic program through the procedure of a non-standard facilities, and the apparatus on the transmitting side responds to this request by sending the diagnostic program to the apparatus on the receiving side. In accordance with the procedure described above, the apparatus on the receiving side stores the diagnostic program in the memory 7 and then can execute the program.

As will be understood from the foregoing description, the facsimile apparatus exemplifying this embodiment is such that it will suffice to store, in the ROM 8, only the program for executing the original functions of the facsimile apparatus. That is, the facsimile apparatus receives the diagnostic program sent to it through the communication line and stores this program in the memory 7, whereby the diagnostic program is made available within the apparatus. As a result, it is possible to efficiently utilize the memory space of the ROM 8 so that a control program capable of providing the user with more functions can be stored in the ROM 8. By using the diagnostic program thus stored in the memory 7, maintenance can be automated, the time for maintenance can be curtailed and cost can be reduced.

[Second Embodiment]

The second embodiment relates to a facsimile apparatus in which the starting time of the diagnostic program mentioned in the first embodiment can be instructed from a facsimile apparatus on the transmitting side.

Figure 4:
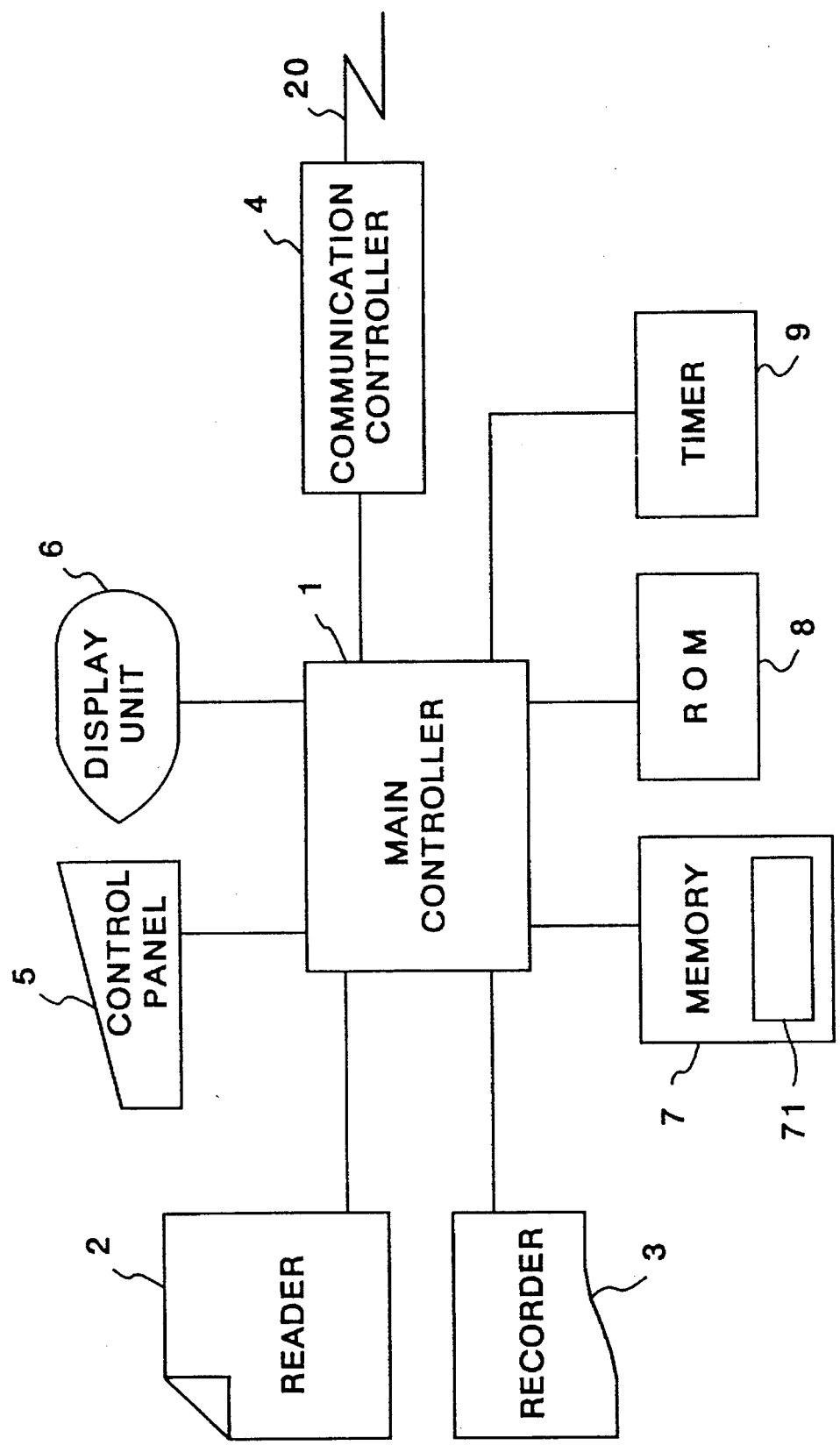
FIG. 4 is a block diagram illustrating a facsimile apparatus according to a second embodiment of the present invention.

FIG. 4 is a block diagram illustrating the facsimile apparatus according to the second embodiment. The blocks designated by reference numerals 1 through 8 and the line designated by numeral 20 are the same as their counterparts in the first embodiment and need not be described again. A time storage area 71 is provided within the memory 7 and the starting time of the diagnostic program is stored in this area in advance. When a time designated in the main controller 1 arrives, a timer 9 functions to inform the main controller 1 of this fact.

As for the method of starting the diagnostic program, the identification signal in the pre-communication procedure is made to include beforehand a designation of starting time as well, and it is so arranged that the diagnostic program is started when the designated time arrives. If an arrangement such as this is adopted, the diagnostic program can be executed in a certain time period when the user makes infrequent use of the facsimile apparatus.

Figure 5:
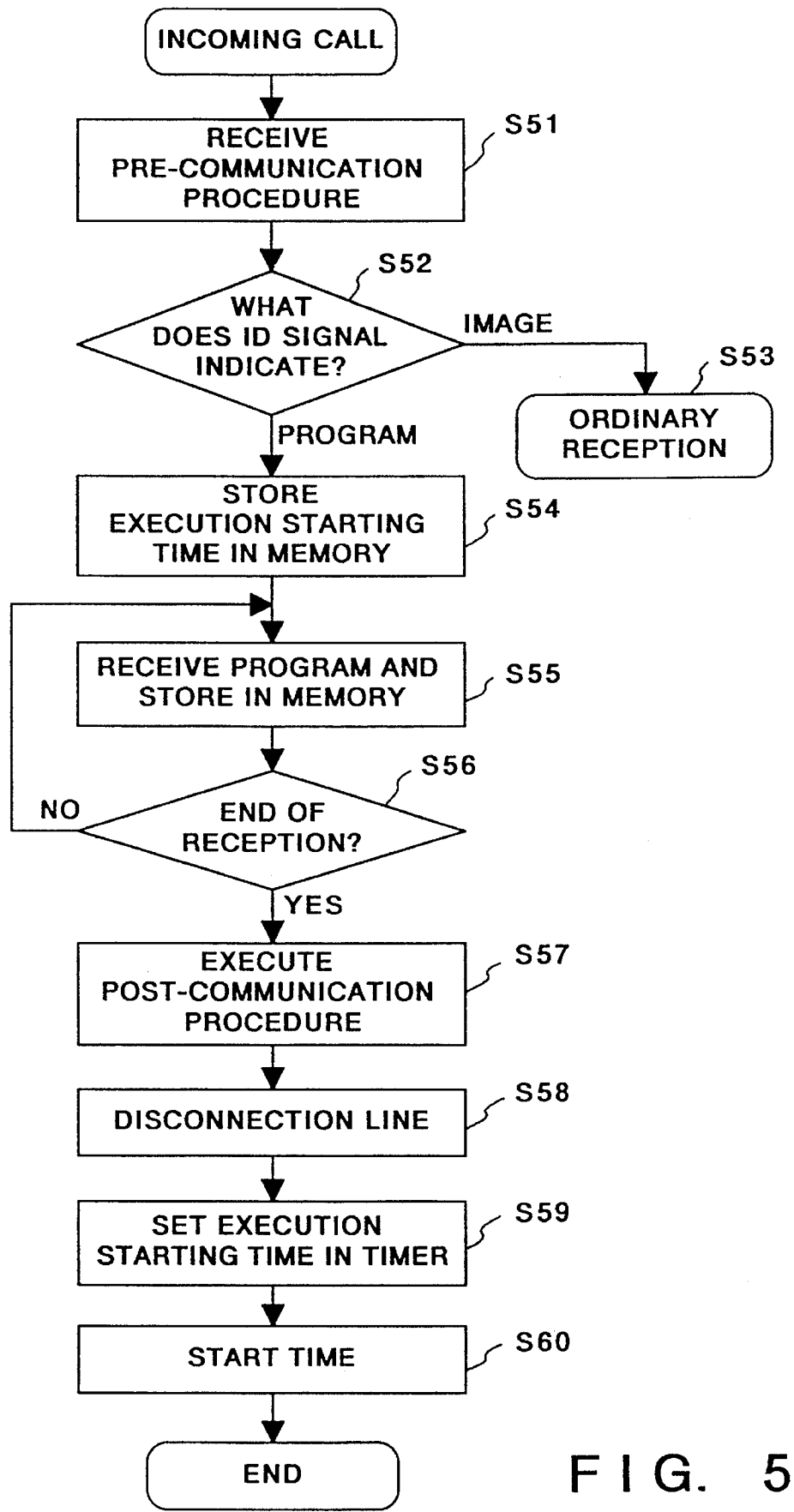
FIG. 5 is a flowchart for describing, in outline form, the operation of reception processing by a main controller in the facsimile apparatus of the second embodiment.

The main controller 1 executes reception processing in accordance with the procedure of the flowchart shown in FIG. 5.

In FIG. 5, the pre-communication procedure is received at step S51. In case of a G3 facsimile, for example, the main controller 1 determines whether image data or a diagnostic program will be sent from the transmitting side. The determination is based upon the NSS signal, from the transmitting side, in accordance with CCITT advisory T.30, and the above-mentioned NSS information attached to the NSS signal. To this end, a predetermined identification signal contained in the NSS information is discriminated at step S52. In a case where it is determined, based upon the NSS information, that image data will be sent, the main controller 1 causes processing to proceed to step S53, at which time ordinary reception is performed. If it is determined at step S52 that the diagnostic program will be sent, however, then the main controller 1 causes processing to proceed to step S54, at which the starting time of the program received as part of the NSS information is stored in the time storage area 71. This is followed by step S55, at which the diagnostic program, sent and incorporated in the ensuing transmitted frame, is received and written in the memory 7. The value stored at step S54 must be preserved in the time storage area 71. Here the memory 7 is used as a FIFO buffer or for intercepting at the time of ordinary reception of image data.

If one frame has thus been received and the diagnostic program impressed upon this frame has been stored in memory 7, it is determined at step S56 whether a frame to be received still remains. If a frame still remains, then the processing returns to step S55 so that the next frame may be received and stored in memory.

Thus, the processing of steps S55 and S56 is executed repeatedly until transmission of the entire diagnostic program ends. If the end of reception has been confirmed at step S56, a post-communication procedure is executed at step S57 and the line is disconnected at step S58.

This is followed by step S59, at which the main controller 1 sets the time that has been stored in the time storage area 71 in the timer 9, and then by step S60, at which the timer 9 is started.

This ends the preparations for executing the diagnostic program at the designated time. When the time set in the timer 9 subsequently arrives, the timer 9 so informs the main controller 1, which proceeds to start execution of the diagnostic program stored in memory 7.

Rather than adopting an arrangement in which the timer 9 informs of the designated time, an arrangement may be adopted in which, when an elapsed time is set, and the main controller 1 is informed of the fact that this time has run out. Further, an arrangement is feasible in which the main controller monitors time by referring to a clock and starts the program at a designated time. In such case, the timer 9 would be a simple clock and it would suffice if the time could be read from the main controller 1.

[Third Embodiment]

In the first and second embodiments described above, the program which the facsimile apparatus receives via communication and then executes is limited to a diagnostic program. However, the program thus received and executed can be one which implements an extended function for the user. In such case, the control panel 5 would be provided with an extended-function key for starting the transmitted program and designating execution of the extended function. By using the extended-function key, the user would be able to execute an extended function while making the necessary designations, such as the starting of the program.

Further, in the first and second embodiments, the transmitted program is limited to a single program. However, it is possible to adopt an arrangement in which the apparatus on the transmitting side not only indicates whether the data to be sent is a program or an ordinary image but also places the number of programs to be sent and their type on the NSS information so as to inform of this as well. A plurality of programs could then be placed in the memory 7. Of course, the plurality of programs may implement functions that differ from one another. For example, of two programs which the apparatus on the transmitting side sends simultaneously, one can be a diagnostic program and the other can be a program which provides the user with an extended function.

[Fourth Embodiment]

Figure 6:
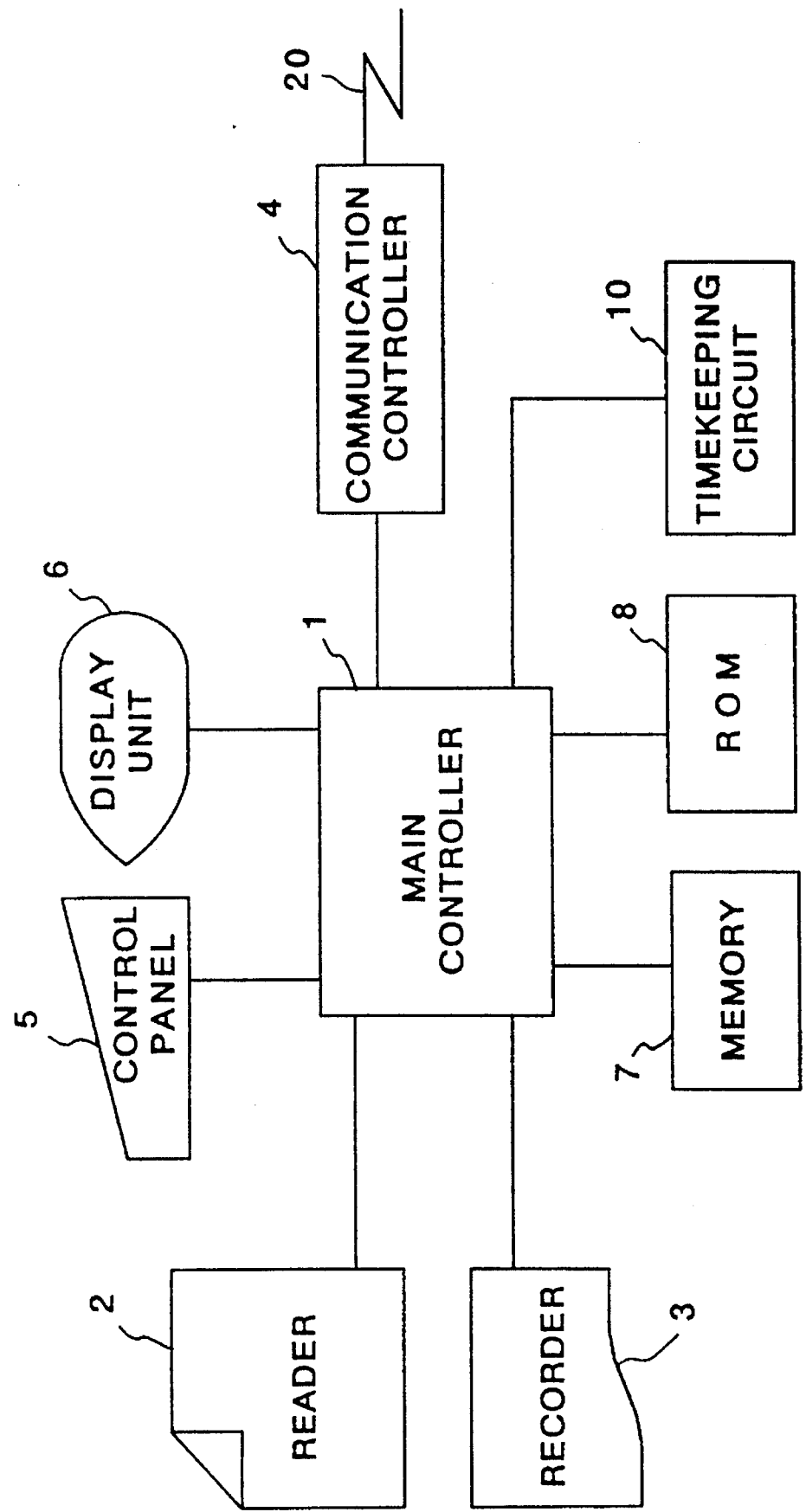
FIG. 6 is a block diagram illustrating a fourth embodiment of the present invention.

FIG. 6 is a block diagram illustrating the construction of a facsimile apparatus according to a fourth embodiment of the present invention.

In FIG. 6, the main controller 1, which includes a microprocessor and a RAM serving as a working area, is used for controlling the overall operation of the apparatus. The ROM 8 stores control programs and provided externally of the main controller 1. The reader 2, which is constituted by such components as a CCD image sensor and a mechanism for conveying an original, optically reads an image carried on the original and converts the read image into an electrical image signal. The recorder 3, which is constituted by a thermosensitive printer or laser printer, prints the image on recording paper. The communication controller 4, which has a modem and an NCU, etc., communicates image information and the like between itself and another party's transmitting apparatus. The control panel 5 comprises a keyboard and the like and is used by the operator to provide inputs from various keys. The display unit 6, such as an LCD, displays various information, such as the status of the facsimile apparatus, telephone numbers and the abbreviated names of other parties. The memory 7 is a rewritable memory in which image information and other data may be stored in advance. The arrangement is such that a diagnostic program sent by communication is stored in the memory 7, and such that time data for deciding the length of time during which this program is to be preserved in the memory 7 is also stored therein.

A timekeeping circuit 10 is used for clocking the length of time during which the diagnostic program is to be preserved.

Figure 7:
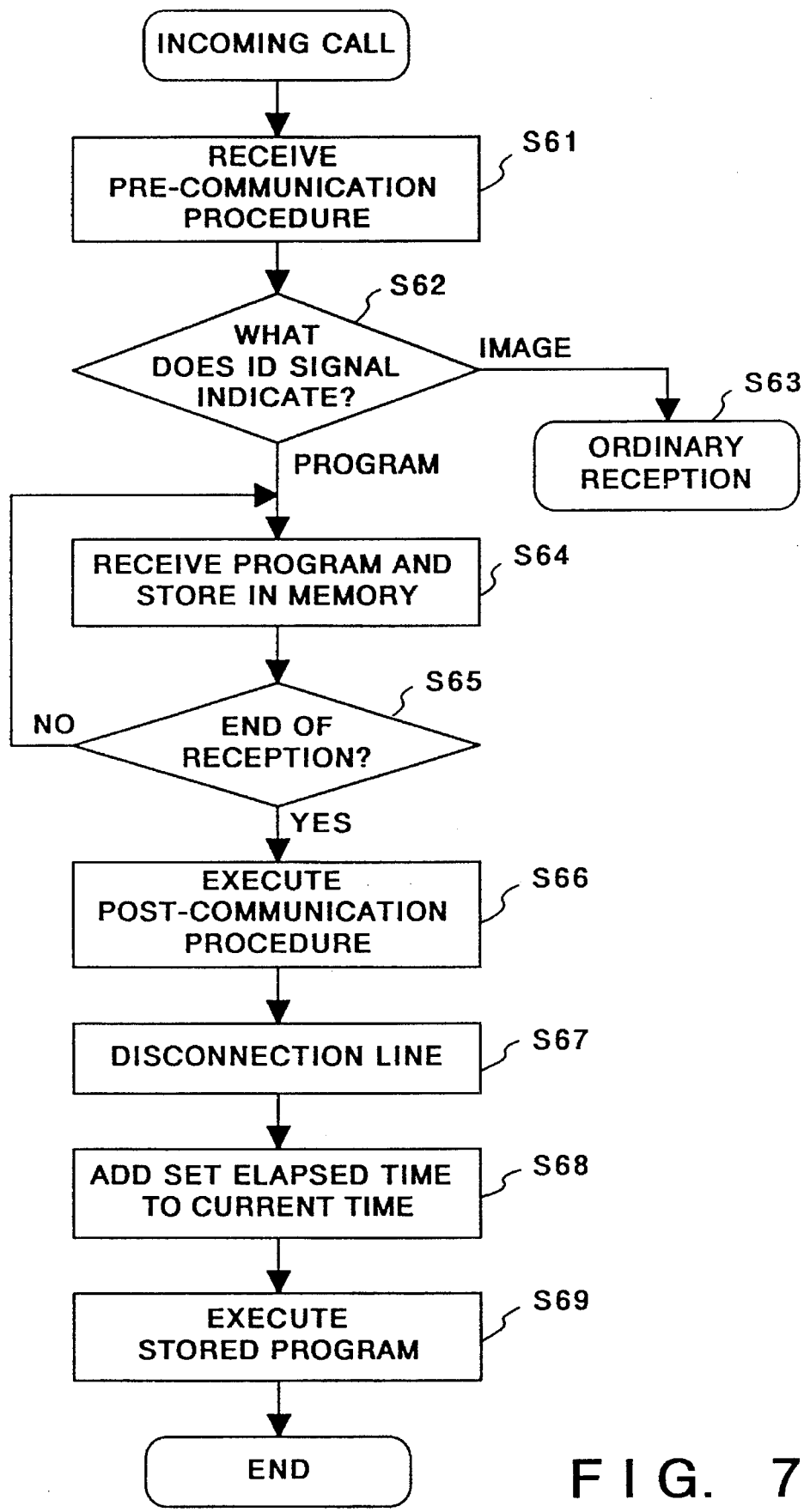
FIG. 7 is a flowchart illustrating an incoming-call operation according to the fourth embodiment.

FIG. 7 is a flowchart illustrating the operation performed by the main controller 1 when data arrives at the facsimile apparatus of this embodiment.

First, a pre-communication procedure signal is received at step S61 the apparatus on the receiving side is started by an incoming signal from the line 20. In case of a G3 facsimile, the aforementioned NSS signal sent from the transmitting side in accordance with CCITT advisory T.30 is analyzed. Based upon the analysis, it is determined at step S62, in accordance with a predetermined identification signal, whether an image or the diagnostic program will be sent. In a case where it is determined at step S62 that image data will be sent, ordinary reception is performed at step S63. If it is determined at step S62 that the diagnostic program will be sent, however, then the diagnostic program is received and written in the memory 7 at step S64.

It should be noted that a FIFO buffer or a memory area used in intercepting may be utilized as the memory 7 at the time of ordinary reception of image data. In addition, the program is transmitted as the file of a program in an execution format that makes use of an HDLC frame. The program can be transmitted through a technique in which image data in an ECM transmission system according to the CCITT advisory is replaced by a program.

When the reception and writing of the diagnostic program ends as determined at step S65, a post-communication procedure is carried out at step S66 and the line is disconnected at step S67.

Next, reference is made to the current time and to the time data that has been stored in the memory 7, and the time at which the diagnostic program should be erased is calculated at step S68. The time data may be data sent along with the diagnostic program or data inputted by a different method. Step S68 is followed by step S69, at which the diagnostic program stored in the memory 7 is executed. The diagnostic program can be executed through a method in which, by way of example, the diagnostic program is started by calling a subroutine from the control program stored in the ROM 8.

The apparatus enters a stand-by state when execution of the diagnostic program ends.

Figure 8:
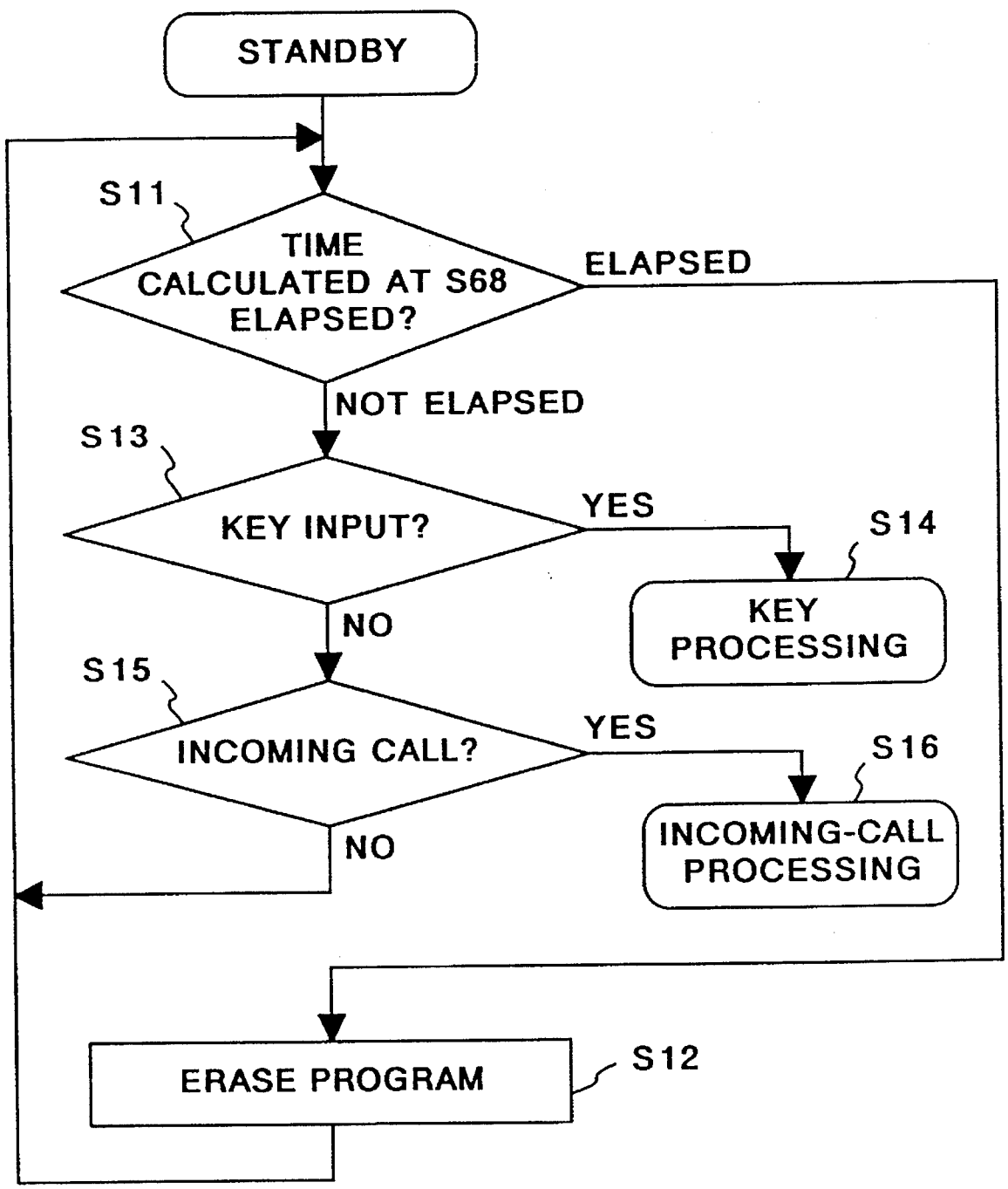
FIG. 8 is a flowchart illustrating an operation for erasing a program in accordance with the fourth embodiment.

FIG. 8 is a flowchart of processing in which the main controller 1 erases the diagnostic program stored in the memory 7.

At step S11 of the flowchart of FIG. 8, it is determined whether the time calculated at step S68 has arrived. This is done by referring to the current time in the standby state. If the calculated time has arrived, the diagnostic program that has been stored in the memory 7 is erased at step S12.

If a key is pressed at step S12 to make an input in the standby state, processing in accordance with this input is executed at step S14. If there is an incoming call from another communication apparatus (YES at step S15), then the incoming-call processing shown in FIG. 7 is executed at step S16.

By thus realizing a facsimile apparatus which receives a diagnostic program via communication, the functions of the facsimile apparatus can be diagnosed without dispatching a serviceman to the user's location. This makes it possible to perform unmanned maintenance. In addition, by erasing the diagnostic program upon passage of a fixed period of time, the memory area can be utilized effectively.

In the fourth embodiment set forth above, only one program is transmitted. However, the type of program transmitted can be communicated to the apparatus on the receiving side by the identification signal contained in the pre-communication procedure. It will then be possible, based upon the notification thus communicated, for the apparatus on the receiving side to place a plurality of programs in the memory 7. In such case, an arrangement may be adopted in which items of time information for program erasure are stored for respective ones of the programs.

This invention is not limited to diagnostic programs, since programs for extended functions may be treated in the same manner.

Though the passage of time is monitored in the standby state in the foregoing embodiment, monitoring may be performed by periodic interrupt processing. In this case, monitoring would not be carried out during execution of a program.

Further, it is possible to adopt an arrangement in which a program may be erased not only at elapse of a fixed period of time but also by the operator's pressing a key (a start key, for example) on the control panel.

Thus, in accordance with this aspect of the present invention, a program necessary for a facsimile apparatus is received from the outside and stored in a rewritable memory. As a result, the storage capacity of a ROM need not be enlarged for the sake of such a program. In addition, memory area can be utilized efficiently by erasing a diagnostic program upon elapse of fixed period of time.

The present invention may be applied to an arrangement comprising a plurality of devices or to one comprising only a single device. It goes without saying that the invention is also applicable to a case where a program is supplied to a system or apparatus.

The present invention is not limited to the above embodiment and various changes and modifications can be made within the spirit and scope of the present invention. Therefore, to apprise the public of the scope of the present invention the following claims are made.

What is claimed is:

1. A facsimile apparatus for receiving and transmitting image information, comprising:

receiving means for receiving image information and program information which is used to control the facsimile apparatus;

determining means for determining whether the information received by said receiving means is the image information or the program information;

controlling means for processing the image information in a case where the received information is determined to be the image information, and for storing the program information into memory means in a case where the received information is determined to be the program information, wherein said control means controls the facsimile apparatus according to the program information stored in the memory means, wherein the program information received by said receiving means includes attribute information which indicates attributes of the program information.

2. The facsimile apparatus according to claim 1, wherein the program information includes an extended program.

3. The facsimile apparatus according to claim 2, wherein the extended program is used for performing a self-diagnostic function.

4. The facsimile apparatus according to claim 1, wherein said determining means determines that the received information is the program information in accordance with detection of information, included in a signal for a facsimile control procedure, which indicates that the program information is to be transmitted.

5. The facsimile apparatus according to claim 1, wherein said controlling means erases the program information stored in the memory means after elapse of a predetermined time period.

6. The facsimile apparatus according to claim 1, further comprising designating means for designating a starting time for the execution of the program information, wherein said controlling means controls the facsimile apparatus in accordance with the program information received by said receiving means at the starting time designated by said designating means.

7. The facsimile apparatus according to claim 1, further comprising input means for inputting an execution designation by an operator, wherein said controlling means controls the facsimile apparatus according to the program information received by said receiving means in response to the designation input by said input means.

8. The facsimile apparatus according to claim 1, wherein said controlling means controls the facsimile apparatus in accordance with the program information received by said receiving means when storage of the program information is completed.

9. The facsimile apparatus according to claim 1, wherein said memory means stores the program information in a RAM separately from an already existing program information stored in a ROM.

10. The facsimile apparatus according to claim 9, wherein the RAM is the same as a RAM which stores the image information.

11. A control method of facsimile apparatus for receiving and transmitting image information, comprising the steps of:

receiving image information and program information which is used to control the facsimile apparatus;

determining whether the information received at said receiving step is the image information or the program information;

processing the image information in a case where the received information is determined to be the image information;

storing the program information into a memory in a case where the received information is determined to be the program information; and controlling the facsimile apparatus according to the program information, wherein the program information received at said receiving step includes attribute information which indicates attributes of the program information.

12. The control method according to claim 11, wherein said program information includes an extended program.

13. The control method according to claim 12, wherein the extended program is for performing a self-diagnostic function.

14. The control method according to claim 11, wherein, at said determining step, the received information is determined to be the program information in accordance with detection of information, included in information for a facsimile control procedure, which indicates that the program information is to be transmitted.

15. The control method according to claim 11, wherein the program information stored in the memory is erased after elapse of a predetermined time period.

16. The control method according to claim 11, further comprising a designating step of designating a starting time, wherein the facsimile apparatus is controlled in accordance with the program information received at said receiving step at the starting time designated at said designating step.

17. The control method according to clam 11, further comprising an input step of inputting an execution designation by an operator, wherein the facsimile apparatus is controlled in accordance with the program information received at said receiving step in response to designation input at said input step.

18. The control method according to claim 11, wherein the facsimile apparatus is controlled in accordance with the program information received at said receiving step when storage of the program information is completed.

19. The control method according to claim 11, wherein the program information is stored in a RAM separately from an already existing program information stored in a ROM.

20. The control method according to claim 19, wherein the RAM is the same as a RAM which stores the image information.

* * * * *

UNITED STATES PATENT AND TRADEMARK OFFICE
CERTIFICATE OF CORRECTION

PATENT NO. : 5,565,999

DATED : October 15, 1996

INVENTOR : MASATOMO TAKAHASHI

It is certified that error appears in the above-identified patent and that said Letters Patent is hereby corrected as shown below:

<u>ON TITLE PAGE</u>
item
[56] References Cited  Foreign Patent Documents

"2/1984" should read --4/1984--.

<u>COLUMN 4</u>

Line 19,  "a" should be deleted;
Line 67,  "In" should read --In the--.

<u>COLUMN 5</u>

Line 44,  "and" should be deleted.

UNITED STATES PATENT AND TRADEMARK OFFICE
CERTIFICATE OF CORRECTION

PATENT NO. : 5,565,999

DATED : October 15, 1996

INVENTOR : MASATOMO TAKAHASHI

It is certified that error appears in the above-identified patent and that said Letters Patent is hereby corrected as shown below:

COLUMN 6

Line 16, "and" should read --and is--;
Line 44, "S61" should read --S61 and--;
Line 45, "In" should read --In the --.

Signed and Sealed this

Sixth Day of May, 1997

*Attest:*

BRUCE LEHMAN

*Attesting Officer*   Commissioner of Patents and Trademarks